(12) United States Patent
Shimomai et al.

(10) Patent No.: US 9,183,871 B2
(45) Date of Patent: Nov. 10, 2015

(54) OPTICAL RECORDING DEVICE, OPTICAL RECORDING METHOD AND MULTI-LAYER DISK

(71) Applicant: TAIYO YUDEN CO., LTD., Taito-ku, Tokyo (JP)

(72) Inventors: Kenichi Shimomai, Takasaki (JP); Yutaka Imamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 14/400,199

(22) PCT Filed: Mar. 27, 2013

(86) PCT No.: PCT/JP2013/058934
§ 371 (c)(1),
(2) Date: Nov. 10, 2014

(87) PCT Pub. No.: WO2013/168477
PCT Pub. Date: Nov. 14, 2013

(65) Prior Publication Data
US 2015/0131420 A1 May 14, 2015

(30) Foreign Application Priority Data

May 11, 2012 (JP) ................. 2012-110057

(51) Int. Cl.
*G11B 7/0045* (2006.01)
*G11B 7/007* (2006.01)
(Continued)

(52) U.S. Cl.
CPC .......... *G11B 7/00736* (2013.01); *G11B 7/1267* (2013.01); *G11B 7/2405* (2013.01); *G11B 7/24038* (2013.01);
(Continued)

(58) Field of Classification Search
None
See application file for complete search history.

(56) References Cited

U.S. PATENT DOCUMENTS

2009/0303854 A1* 12/2009 Nakatani et al. ................ 369/94
2010/0014400 A1* 1/2010 Yoshida et al. ............ 369/47.53
(Continued)

FOREIGN PATENT DOCUMENTS

JP 2007-004984 A 1/2007
JP 2007-200427 A 8/2007
(Continued)

OTHER PUBLICATIONS

International Search Report (ISR), mailed May 7, 2013, issued for International application No. PCT/JP2013/058934.
(Continued)

*Primary Examiner* — Wayne Young
*Assistant Examiner* — Brian Butcher
(74) *Attorney, Agent, or Firm* — Law Office of Katsuhiro Arai

(57) ABSTRACT

An optical recording device that records to a multi-layer disk having multiple recording layers includes a controller which sets a data area in which user data is recorded, and a calibration area including a main calibration area and at least one sub-calibration area which are used to calibrate the intensity of laser light for recording, with the same layout among the plurality of recording layers, conducts first calibration for performing initial recording in the data area by using the main calibration area, records dummy data in the remainder of the main calibration area, and conducts second calibration for performing additional recording in the data area by using the sub-calibration area.

2 Claims, 16 Drawing Sheets

(51) Int. Cl.
*G11B 7/1267* (2012.01)
*G11B 20/10* (2006.01)
*G11B 20/12* (2006.01)
*G11B 7/24038* (2013.01)
*G11B 7/2405* (2013.01)

(52) U.S. Cl.
CPC ............... *G11B 2020/10861* (2013.01); *G11B 2020/1275* (2013.01); *G11B 2020/1288* (2013.01)

(56) References Cited

U.S. PATENT DOCUMENTS

2011/0158069 A1 6/2011 Mutsuro et al.
2011/0170382 A1 7/2011 Takahashi et al.

FOREIGN PATENT DOCUMENTS

| JP | 2008-192258 A | 8/2008 |
| JP | 2011-138575 A | 7/2011 |
| WO | 2010/035444 A1 | 4/2010 |

OTHER PUBLICATIONS

International Preliminary Report on Patentability (PCT/IB/373) issued Nov. 11, 2014, with Translation of Written Opinion of the International Searching Authority (PCT/ISA/237), for corresponding international application PCT/JP2013/058934.

\* cited by examiner

OPTICAL RECORDING DEVICE, OPTICAL RECORDING METHOD AND MULTI-LAYER DISK

This application is the U.S. National Phase under 35 U.S.C. §371 of International Application PCT/JP2013/058934, filed Mar. 27, 2013, which claims priority to Japanese Patent Application No. 2012-110057, filed May 11, 2012. The International Application was published under PCT Article 21(2) in a language other than English.

TECHNICAL FIELD

The present invention relates to an optical recording device and optical recording method involving recording to a multi-layer disk having multiple recording layers, as well as a multi-layer disk.

BACKGROUND ART

Optical disks such as DVDs (digital versatile disks) and Blu-ray Discs (registered trademark) are given multiple recording layers for the purpose of increasing their capacity. As these disks now have multiple layers, a tracking control method is known whereby data is recorded to or played back from the recording layers using guide tracks provided in a layer different from the recording layers. For example, optical drive devices, etc., are available that perform tracking control using light of 390 nm to 420 nm in wavelength (blue) to a guide tracking layer having grooved guide tracks provided in it, and record data to one of multiple recording layers using light of 650 nm to 680 nm in wavelength (red) (refer to Patent Literature 1, for example).

Even with such optical drive devices that record data to a multi-layer disk having multiple recording layers, it is important to calculate an optimal recording power by test-writing to each recording layer.

For example, assume that a PCA (power calibration area) used for test-writing purposes is provided in the same area of each recording layer in a multi-layer disk and that user data is recorded to fill the recording layers of the multi-layer disk one by one from the recording layer closest to the objective lens of the optical pickup. In this case, after the OPC (optimized power control) process is performed as a calibration process to adjust and optimize the intensity level (power level) of recording laser light in a given recording layer, the PCA is filled with dummy data, so that the OPC process in the next recording layer will be performed under the same conditions applicable to the user data area, because doing so is considered effective in ensuring that data is recorded in a stable manner (refer to Patent Literature 2, for example).

PRIOR ART LITERATURES

Patent Literatures

Patent Literature 1: Japanese Patent Laid-open No. 2007-200427

Patent Literature 2: Japanese Patent Laid-open No. 2007-4984

SUMMARY OF THE INVENTION

Problems to Be Solved by the Invention

Incidentally, when recording to an optical disk, the OPC process must also be performed in the case of additional recording, meaning that additional data is recorded to a recording layer in which data is already recorded. However, the OPC process for additional recording to a multi-layer disk has not been studied sufficiently to date. In fact, Patent Literature 2 mentions deleting the PCA of a recording layer in which data is already recorded and then test-writing the PCA for the purpose of the OPC process before data is recorded to this recording layer. However, this method cannot be applied to disks other than rewritable disks, such as write-once disks.

In light of the aforementioned situation, the object of the present invention is to provide an optical recording device, optical recording method and multi-layer disk that can be used to calibrate the intensity of recording laser light in the case of additional recording to a multi-layer disk, by considering the effect of inter-layer crosstalk that occurs when stray light from an adjacent recording layer mixes into the optical detection element.

Means for Solving the Problems

To achieve the above object, the optical recording device pertaining to an embodiment of the present invention is an optical recording device that records to a multi-layer disk having multiple recording layers, wherein such optical recording device comprises: an optical pickup that selectively irradiates laser light to the recording layers via an objective lens; and a control part that performs controls in such a way as to: set in each of the multiple recording layers a data area where user data is recorded and a calibration area used for the intensity calibration process of the laser light for recording, including a main calibration area and at least one sub-calibration area, according to the same layout that applies to all of the multiple recording layers; use the main calibration area to perform a first calibration process for implementing initial recording to the data area in each of the multiple recording layers one by one from the recording layer farthest away from or closest to the objective lens of the optical pickup; record dummy data to the remainder of the main calibration area; and use the at least one sub-calibration area to perform a second calibration process for additional recording to the data area.

With the optical recording device proposed by the present invention, the control part performs controls that involve using the main calibration area to perform the first calibration process for initial recording to the data area, and then recording dummy data to the remainder of the main calibration area, and consequently the main calibration area is filled with a pit array comprising the test-written data in the first calibration process and the dummy data. This guarantees that the first calibration process for obtaining the intensity of recording laser light with respect to the data area in the recording layer to which data will be recorded next will be performed under conditions equivalent to those applicable to this data area in terms of optical transmission characteristics, and particularly that optimal intensity will be obtained by considering the effect of inter-layer crosstalk that occurs when stray light from an adjacent recording layer mixes into the optical detection element. In addition, the optical recording device proposed by the present invention permits the second calibration process for additional recording to the data area to be performed in each recording layer using the sub-calibration area provided separately from the main calibration area, which makes it possible to accurately obtain the intensity of laser light for additional recording.

With the optical recording device proposed by the present invention, the control part may perform controls in such a way that, when the recording layer to which data will be recorded next is referred to as the target recording layer and the recording layer to which data was recorded immediately before the target recording layer is referred to as the adjacent recording layer, and when second user data of a larger size than first user data already recorded to the data area of the adjacent recording layer will be recorded to the data area of the target recording layer, then the second user data is divided into a first block corresponding to the size of the first user data and a second block for other data, and the calibration process for the first block is performed as the first calibration process using the main calibration area, while the calibration process for the second block is performed as the second calibration process using the sub-calibration area.

Furthermore, the control part may perform controls in such a way that, after the closing process to prohibit additional recording of the user data to the data area of the target recording layer, the dummy data is recorded to the remainder of the main calibration area.

The optical recording method proposed by the present invention comprises: a step to set in each of the multiple recording layers a data area where user data is recorded and a calibration area used for the intensity calibration process of the laser light for recording, including a main calibration area and at least one sub-calibration area, according to the same layout that applies to all of the multiple recording layers; a step to use the main calibration area to perform a first calibration process for implementing initial recording to the data area in each of the multiple recording layers one by one from the recording layer farthest away from or closest to the objective lens of the optical pickup; a step to record dummy data to the remainder of the main calibration area; and a step to use the sub-calibration area to perform a second calibration process for additional recording to the data area.

The multi-layer disk proposed by the present invention is a multi-layer disk having multiple recording layers, wherein the recording layers each have a data area where user data is recorded, as well as a calibration area used as an area for the intensity calibration process of laser light for recording, including a main calibration area used for the calibration process for initial recording of user data to the data area in each of the recording layers, and at least one sub-calibration area used for the calibration process for additional recording to the data area in each recording layer, where the main calibration area and at least one sub-calibration area are set according to the same layout that applies to all of the multiple recording layers. In addition, the above multi-layer disk may further have a guide layer that has guide tracks to guide recording to the multiple recording layers.

Effects of the Invention

As explained above, according to the present invention, the intensity of recording laser light can be calibrated in a favorable manner in the case of additional recording to a multi-layer disk, by considering the effect of inter-layer crosstalk that occurs when stray light from an adjacent recording layer mixes into the optical detection element.

MODE FOR CARRYING OUT THE PRESENT INVENTION

Figure 1:
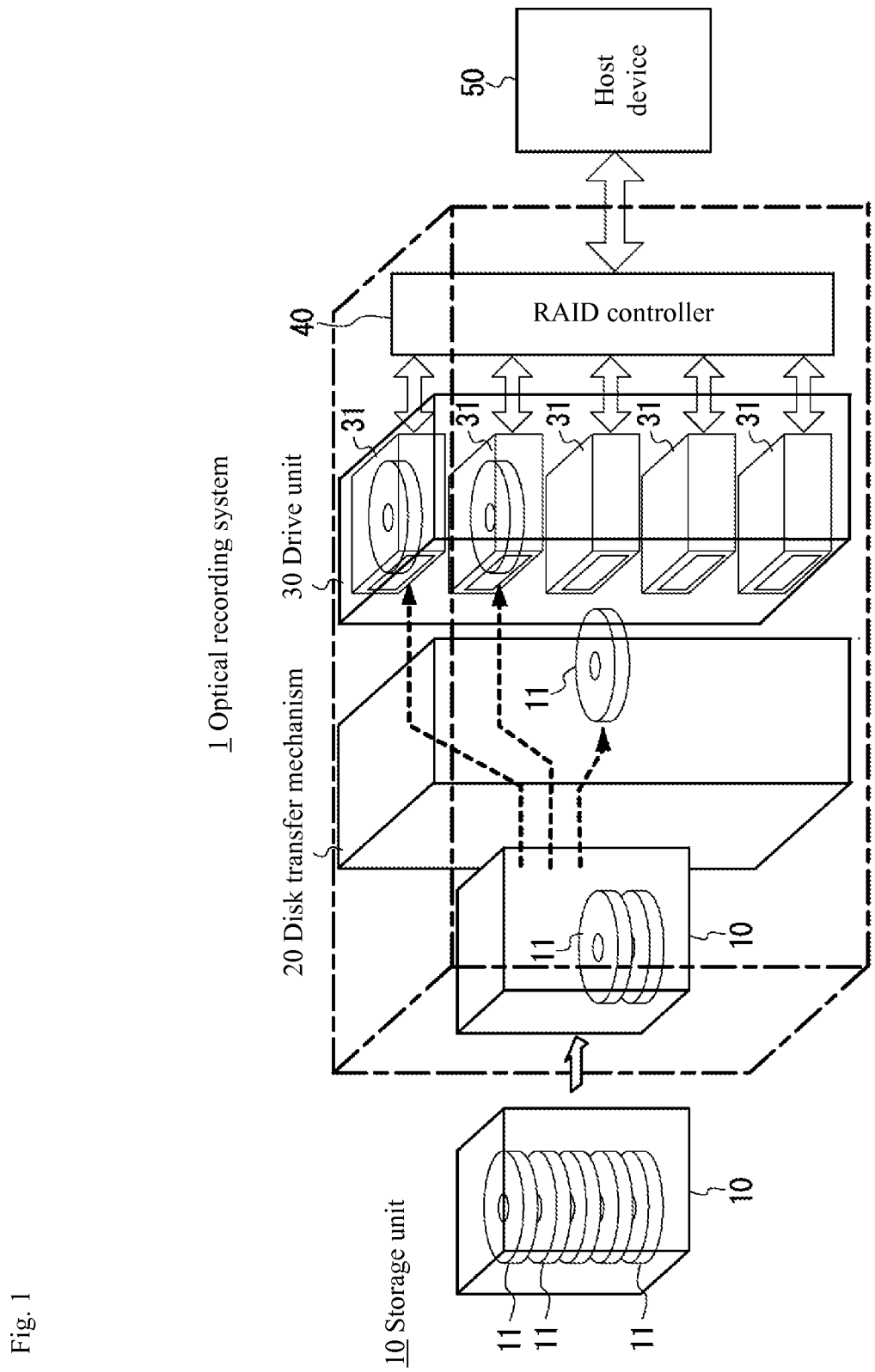
FIG. 1 A drawing showing the optical recording system pertaining to an embodiment of the present invention.

An embodiment of the present invention is explained below by referring to the drawings. FIG. 1 is a drawing showing the optical recording system pertaining to an embodiment of the present invention.

FIG. 1 is a drawing showing the overall structure of the optical recording system. This optical recording system 1 comprises a storage unit 10, disk transfer mechanism 20, drive unit 30, RAID controller 40, and host device 50. They are each explained in detail below.

[Storage Unit 10] The storage unit 10 is a unit in which to store, in a separately and freely settable/removable manner, multiple optical disks 11 that are each a multi-layer optical recording medium.

Multiple optical disks 11 may be stored in the storage unit 10 in a flat stack pattern, single vertical file pattern, etc. Regardless of the pattern, preferably a certain clearance is provided between adjacent optical disks 11 for smooth insertion and removal of the optical disks 11 into/from the storage unit 10. The storage unit 10 may have a rectangular solid shape or cylindrical shape, for example, from the viewpoints of ease of handling by the user, storage efficiency of optical disks 11, and so on. In the example of FIG. 1, a rectangular solid storage unit 10 in which multiple optical disks 11 are stored in a flat stack pattern is used.

Figure 2:
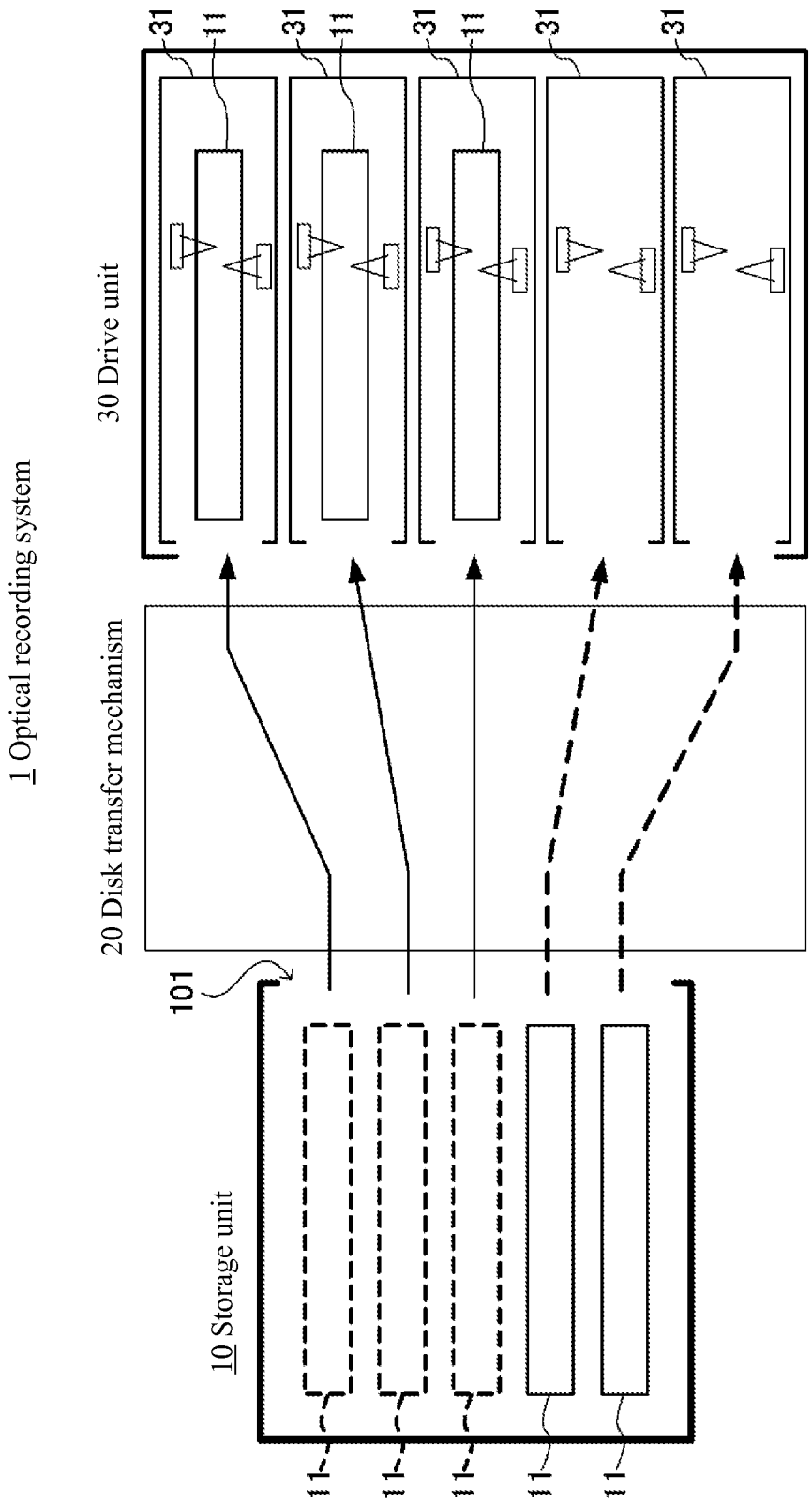
FIG. 2 A drawing showing the structures of the storage unit, disk cartridge and drive unit of the optical recording system in FIG. 1.

FIG. 2 is a drawing showing the structures of the storage unit 10, optical disks 11 and drive unit 30. Provided on at least one side face of the storage unit 10 are an opening 101 for inserting and removing optical disks 11 and a door (not illustrated) that opens and closes this opening 101. The door opens and closes in conjunction with the optical disk 11 insertion and removal operations of the disk transfer mechanism 20 into/from the storage unit 10, and remains closed at all other times.

Note that under the present invention, the structure of the storage unit 10 is not limited to the one shown in FIG. 2. Numerous variations are possible in terms of the shape of the storage unit 10, number and positions of openings, whether or not a door is provided, storage pattern of multiple optical disks 11, etc.

[Optical Disk 11] The optical disks 11 stored in the storage unit 10 are each a so-called "optical disk with guide layer" having a guide layer and recording layers formed independently as different layers.

Figure 3:
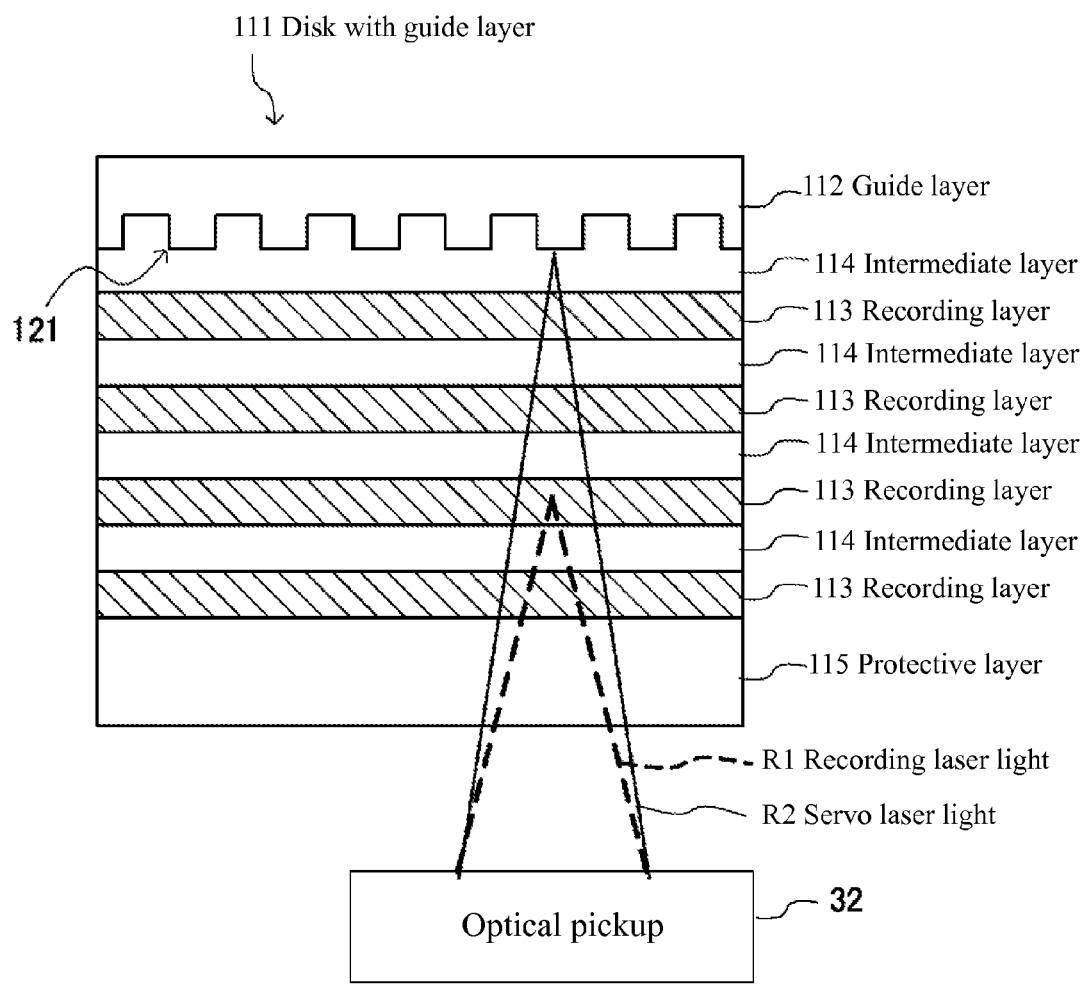
FIG. 3 A section view showing the structure of an optical recording medium with guide layer.

FIG. 3 is a section view showing the structure of an optical disk with guide layer 111. The optical disk with guide layer 111 has a guide layer 112 and multiple recording layers 113. In the example of the optical disk with guide layer 111 in this figure, the number of recording layers 113 is 4. An optically transparent intermediate layer 114 is present between the guide layer 112 and the closest recording layer 113 and between each pair of adjacent recording layers 113. These layers are arranged as follows from the side through which the recording/playback light R1 and guide light R2 enter from the optical pickup 32: A protective layer 115, recording layer 113, intermediate layer 114, recording layer 113, intermediate layer 114, recording layer 113, intermediate layer 114, recording layer 113, intermediate layer 114, and guide layer 112.

On the side of the guide layer 112 facing the recording layer 113, guide tracks 121 of land-groove structure are provided in a spiral or concentric circle pattern for the purpose of tracking control. Formed on the sidewalls of guide tracks 121 via wobble modulation is physical address information indicating the position information all around the disk. The guide tracks 121 are formed, for example, at a track pitch (0.64 µm) corresponding to the red laser light used for DVD (digital versatile disk) recording and playback. The average land-groove pitch is 0.32 µm. The red laser light is hereinafter referred to as the "guide light."

With the optical recording system 1 of this embodiment, tracking control is implemented separately for the lands and grooves of guide tracks 121 according to the differential push-pull (DPP) method, for example. Implementing tracking control separately for the lands and grooves of guide tracks 121 makes it possible to record information to the recording layer 113 at a track pitch of 0.32 µm.

The recording layer 113 is where information is recorded, for example, at a track pitch (0.32 µm) corresponding to the blue laser light used for Blu-ray Disc (registered trademark) recording and playback. This blue laser light is hereinafter referred to as the "recording/playback light" or "recording light." The recording layer 113 comprises an optical absorption layer, reflection layer, etc., for example. For the optical absorption layer, cyanine pigment, azo pigment, and other organic pigments, as well as Si, Cu, Sb, Te, Ge, and other inorganic materials, are used. When the recording light is irradiated onto the target recording layer 113 of the optical disk with guide layer 111, the reflectance of the area over which the recording light was irradiated changes, and as the area whose reflectance has changed is formed as a pit, information is recorded to the recording layer 113.

Since tracking control is implemented and physical addresses and reference clock signals acquired using the guide tracks 121 in the guide layer 112 when information is recorded to or played back from the recording layer 113, the recording layer 113 need not have guide tracks 121 of land-groove structure. This means that the recording layer 113 can have a flat surface.

Figure 4:
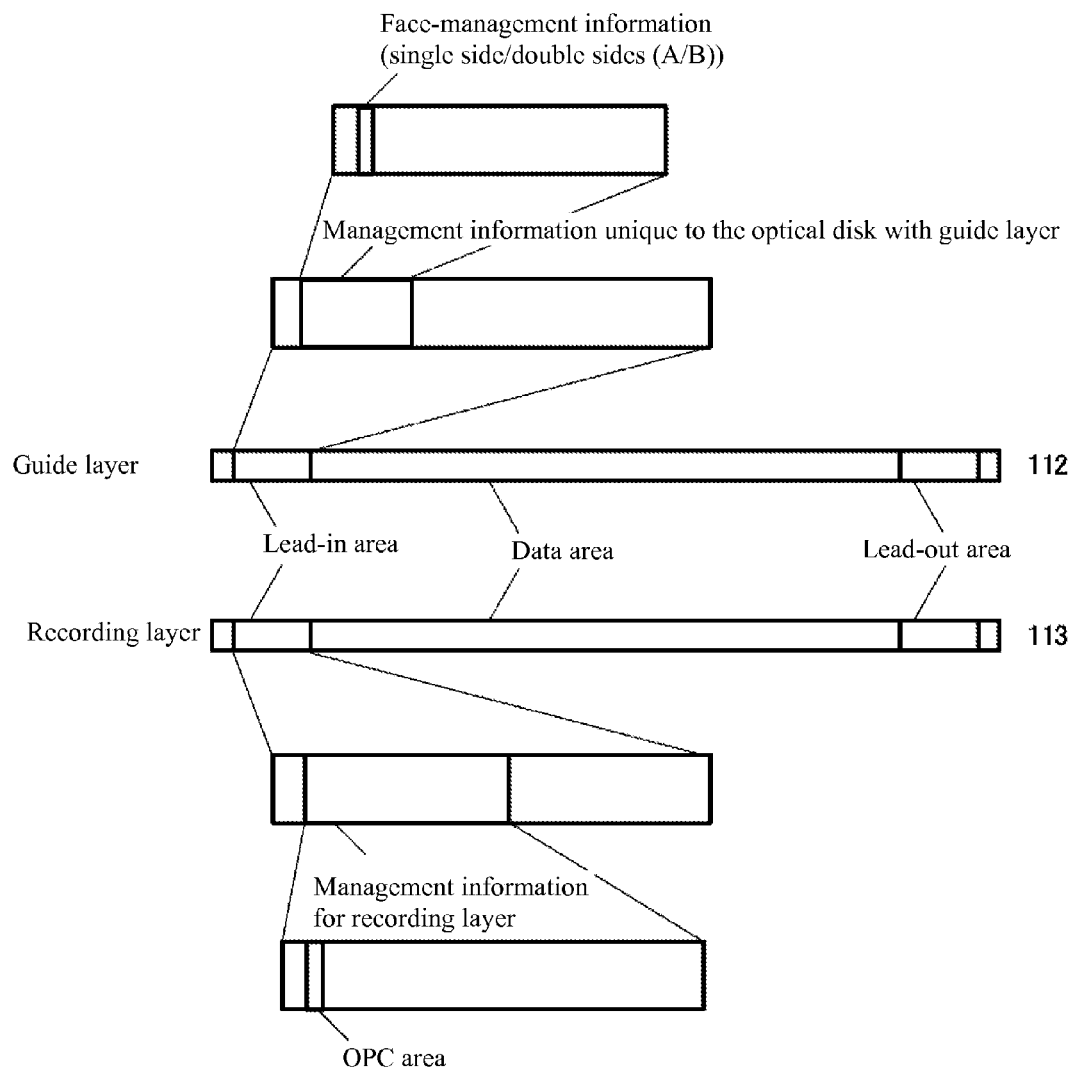
FIG. 4 A drawing showing the structures of the areas, divided at radial-direction positions, in the guide layer and recording layer of the optical recording medium with guide layer.

FIG. 4 is a drawing showing the structures of the areas, divided at radial-direction positions, in the guide layer 112 and recording layer 113 of the optical disk with guide layer 111. The guide layer 112 and recording layer 113 are both divided commonly into the lead-in area, data area, and lead-out area, from the inner periphery side, divided at radial-direction positions.

In the lead-in area of the guide layer 112, management information unique to the optical disk with guide layer 111 has been pre-recorded by means of wobble modulation, etc. The management information unique to the optical disk with guide layer 111 includes the number of recording layers, recording method, recording line speed, recommended information such as the laser power, laser drive pulse waveform, etc., to be applied at the time of recording or playback, position information of the data area, position information of the OPC area, etc.

In the data area of the guide layer 112, physical address information assigned to the data area has been pre-recorded by means of wobble modulation, etc., of the grooves of guide tracks 121.

Incidentally, information identical to the information recorded in the lead-in area may have been pre-recorded in the lead-out area of the guide layer 112 by means of wobble modulation, etc.

The lead-in area of the recording layer 113 is where management information used for recording and playback to/from the recording layer 113 is recorded in the form of a pit array. Management information used for recording and playback to/from the recording layer 113 includes the layer number or other layer information assigned to the recording layer 113, replacement management information relating to the process for replacing missing areas, and optimal laser power for recording, and other recording and playback conditions determined by the OPC process (calibration process), among others.

Also in the lead-in area of each recording layer 113, an OPC area (calibration area) used in the OPC process for determining the recording and playback conditions is provided in a position that applies commonly to all recording layers.

Note that while various methods are already known regarding the OPC process, the OPC process in the present invention only needs to be performed by means of recording and playback of test data to/from the OPC area and the present invention does not depend on any specific method or the like.

Normally the size of the OPC area is set to a value corresponding to a size likely consumed by one OPC process, plus a sufficient margin. Accordingly, in many cases an unused area remains in the OPC area upon completion of one OPC process. In this case, the optical transmission characteristics of the OPC area may vary between the used area (area where a recording marker has been formed) and the unused area. This means that it is not guaranteed that the OPC process will be performed under the conditions of uniform optical transmission characteristics in other recording layers onto which the laser light from the optical pickup is irradiated via the recording layer having this OPC area, and this presents a factor that prevents accuracy improvement of the OPC process. Particularly with a disk whose intermediate layer 114 is thin, there is a problem where signals deteriorate markedly due to inter-layer crosstalk that occurs when stray light from a recording layer adjacent to the target recording layer of the OPC process mixes into the optical detection element.

In this embodiment, the OPC area (calibration area) in each recording layer is constituted by a main OPC area and one or more sub OPC areas as a means for solving the aforementioned problem. How these main OPC area and one or more sub OPC areas are used will be described later.

[Disk Transfer Mechanism 20] The disk transfer mechanism 20 is a mechanism that removes the target optical disk 11 from the storage unit 10 and loads it into a disk drive 31 in the drive unit 30, or returns to the storage unit 10 the optical disk 11 ejected from the disk drive 31.

Ideally the disk transfer mechanism 20 has multiple transfer mechanisms that can be operated independently, so that multiple optical disks 11 can be removed from the storage unit 10 simultaneously and loaded separately into multiple disk drives 31 in the drive unit 30, for example.

[Drive Unit 30] The drive unit 30 has multiple disk drives 31 installed in it. In the example of this figure, five disk drives 31 are installed. The number of optical disks 11 stored in the storage unit 10 need not be the same as the number of disk drives 31 installed in the drive unit 30.

Figure 5:
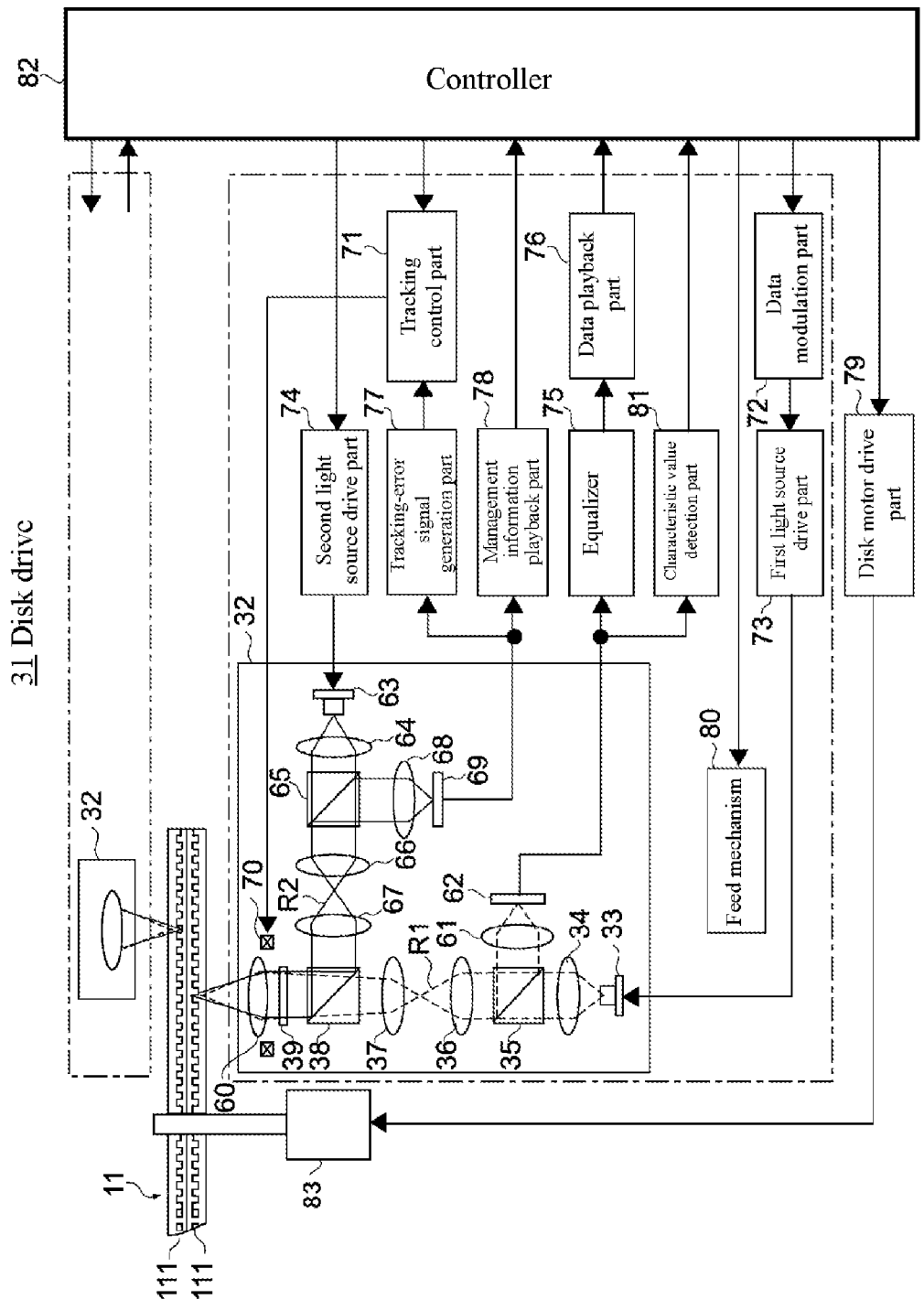
FIG. 5 A drawing showing the structure of the disk drive of the optical recording system in FIG. 1.

(Structure of Disk Drive 31) FIG. 5 is a drawing showing the structure of the disk drive 31 being an optical recording device. This disk drive 31 has an optical pickup 32. The optical pickup 32 has a recording/playback optical system corresponding to the recording/playback light, and a guide optical system corresponding to the guide light.

The recording/playback optical system comprises a first light source 33, first collimator lens 34, first polarizing beam splitter 35, first relay lens 36, second collimator lens 37, synthesizing prism 38, ¼ wavelength plate 39, objective lens 60, first light-receiving lens 61, first light-receiving part 62, etc. Here, the synthesizing prism 38, ¼ wavelength plate 39, and objective lens 60 belong to both the recording/playback optical system and the guide optical system explained later.

The first light source 33 has a laser diode that emits a laser light of a first wavelength as the recording/playback light R1. The recording/playback light R1 emitted from the first light source 33 is converted by the first collimator lens 34 to a parallel light which then travels through the first polarizing beam splitter 35, first relay lens 36, and second collimator lens 37, and enters the synthesizing prism 38. The synthesizing prism 38 synthesizes the recording/playback light R1 entering from the second collimator lens 37 with the guide light R2 of second wavelength entering from a third collimator lens that belongs to the guide optical system described later, in such a way that the optical axes of the two correspond to each other, and causes the synthesized light to enter the objective lens 60 via the ¼ wavelength plate 39. The entered recording/playback light is condensed by the objective lens 60 so that it focuses on the target recording layer 113 (FIG. 3) of one optical disk with guide layer 111 constituting the optical disk 11 which is a double-sided disk.

The recording/playback light (return light) that has been reflected by the recording layer 113 enters the synthesizing prism 38 via the objective lens 60 and ¼ wavelength plate 39, transmits through the synthesizing prism 38 in the direction of entry, and returns to the first polarizing beam splitter 35 via the second collimator lens 37 and first relay lens 36. The first polarizing beam splitter 35 reflects the return light of first wavelength from the first relay lens 36 at an angle of approx. 90 degrees and causes it to enter the first light-receiving part 62 via the first light-receiving lens 61.

The first light-receiving part 62 has a light-receiving element whose light-receiving surface is divided vertically and horizontally into a total of four, for example, and outputs, as a playback signal, a voltage signal of a level appropriate for the light-receiving intensity of each division of the light-receiving surface.

The guide optical system (first guide optical system and second guide optical system) comprises a second light source 63, third collimator lens 64, second polarizing beam splitter 65, second relay lens 66, fourth collimator lens 67, synthesizing prism 38, ¼ wavelength plate 39, objective lens 60, second light-receiving lens 68, second light-receiving part 69, etc.

The second light source 63 emits the guide light R2 being a red laser light. The guide light R2 emitted from the second light source 63 is converted by the third collimator lens 64 to a parallel light which then travels through the second polarizing beam splitter 65, second relay lens 66, and fourth collimator lens 67, and enters the synthesizing prism 38. As mentioned earlier, the guide light R2 entering the synthesizing prism 38 is synthesized by the synthesizing prism 38 with the recording/playback light R1 of first wavelength entering from the second collimator lens 37 of the recording/playback optical system, in such a way that the optical axes of the two correspond to each other, and the synthesized light is caused to enter the objective lens 60 via the ¼ wavelength plate 39. The entered guide light R2 is condensed by the objective lens 60 so that it focuses on the guide layer 112 (FIG. 3) of one optical disk with guide layer 111 constituting the optical disk 11 which is a double-sided disk.

The guide light R2 (return light) reflected by the guide layer 112 enters the synthesizing prism 38 via the objective lens 60 and ¼ wavelength plate 39, is reflected by the synthesizing prism 38 at an angle of approx. 90 degrees, and returns to the second polarizing beam splitter 65 via the fourth collimator lens 67 and second relay lens 66. The second polarizing beam splitter 65 reflects the return light of the guide light R2 from the second relay lens 66 at an angle of approx. 90 degrees and causes it to enter the second light-receiving part 69 via the second light-receiving lens 68.

The second light-receiving part 69 has a light-receiving element whose light-receiving surface is divided vertically and horizontally into a total of four, for example, and outputs, as a playback signal, a voltage signal of a level appropriate for the light-receiving intensity of each division of the light-receiving surface.

Also, the optical pickup 32 has a tracking actuator 70 and focusing actuator (not illustrated) provided in it. The tracking actuator 70, being controlled by the tracking control part 71, moves the objective lens 60 in the radial direction of the disk, or to be specific, vertically with respect to the optical axis. The focusing actuator, being controlled by a focus-control part not illustrated here, moves the objective lens 60 in the direction of the optical axis.

Also provided in the optical pickup 32 are a first relay lens actuator that moves the first relay lens 36 in the direction of the optical axis so as to switch the recording layer 113 on which to irradiate the recording/playback light, and a second relay lens actuator that moves the second relay lens 66 in the direction of the optical axis, both of which are not illustrated here. The foregoing explained the optical pickup 32.

In addition to the optical pickup 32 mentioned above, the disk drive 31 also has a tracking control part 71, data modulation part 72, first light-source drive part 73, second light-source drive part 74, equalizer 75, data playback part 76, tracking-error signal generation part 77, management information playback part 78, disk-motor drive part 79, feed mechanism 80, characteristic value detection part 81, and controller 82, as well as focus-control part, relay lens control part not illustrated here, etc.

The data modulation part 72 modulates the recording data fed from the controller 82 and feeds the modulation signals to the first light-source drive part 73.

The first light-source drive part 73 generates driving pulses for driving the first light source 33 based on the modulation signals from the data modulation part 72.

The equalizer 75 performs an equalizing process, such as PRML (partial response maximum likelihood), on the playback RF signals from the first light-receiving part 62 to generate binary signals.

The data playback part 76 demodulates data from the binary signals output by the equalizer 75 and performs a decoding process, such as error correction, to generate playback data from the demodulated data and feeds it to the controller 82.

The tracking-error signal generation part 77 uses the differential push-pull method, for example, to generate a tracking-error signal based on the output of the second light-receiving part 69, and feeds the signal to the tracking control part 71.

The tracking control part 71 controls the tracking actuator 70 based on the tracking error signal from the tracking-error signal generation part 77, and causes the objective lens 60 to move vertically with respect to the optical axis and thereby performs tracking control.

The management information playback part 78 plays back the management information that has been modulated to groove wobbles of the guide layer, based on the output of the second light-receiving part 69, for example, and feeds the information to the controller 82.

The disk-motor drive part 79 feeds driving signals to the disk motor 83 that drives and rotates the optical disk 11 under the control by the controller 82.

The feed mechanism 80 is a mechanism that transfers the optical pickup 32 in the radial direction of the optical disk 11.

A characteristic value detection part 81 receives as an input the current signal output by the first light-receiving part 62, and uses this value of current to detect the physical characteristic value of recording light (return light) and feeds it to the controller 82 (control part). The physical characteristic value of recording light (return light) can be anything so long as it is a characteristic value appropriate for calculating an optimal value of recording power. Examples include the asymmetry value that provides an evaluation indicator representing the amplitude symmetry of the shortest recording mark/shortest space and longest recording mark/longest space of RF signals, and the β value which is an indicator value for evaluating the RF signal symmetry, but the choice is not limited to the foregoing under the present invention.

The focus-control part not illustrated here drives the focusing actuator not illustrated here, either, to move the objective lens 60 in the direction of the optical axis.

The controller 82 (control part) has a CPU (central processing unit), ROM (read only memory), RAM (random access memory), etc. The controller 82 controls the disk drive 31 as a whole based on the program loaded in the main memory area allocated to the RAM.

The controller 82 (control part) performs the OPC process for calculating the optimal intensity of recording laser light (hereinafter referred to as "Optimal Recording Power"), based on the physical characteristic value of recording light (return light) that has been fed by the characteristic value detection part 81, and feeds a control signal to the first light-source drive part 73 so that recording light of the optimal recording power will be emitted from the first light source 33.

Installed in the drive unit 30 are multiple disk drives 31 as described above, which can be controlled independently to simultaneously record and play back information to/from the optical disks 11 loaded in them.

As it is expected to support double-sided disks, the optical recording system 1 in this embodiment has a pair of optical pickups 32, or specifically a first optical pickup (including a first guide light optical system) and second optical pickup (including a second guide light optical system) for each disk drive 31, positioned on one side (front side) and the other side (reverse side) of the optical disk 11, respectively, where the data modulation part 72, first light-source drive part 73, second light-source drive part 74, equalizer 75, data playback part 76, tracking-error signal generation part 77, tracking control part 71, management information playback part 78, feed mechanism 80, characteristic value detection part 81, focus-control part, relay lens control part, etc., are provided for each optical pickup 32. And, the controller 82 is supposed to perform general control of the two systems mentioned above. It should be noted, however, that the present invention is not limited to such ability to play back double-sided disks.

[RAID Controller 40] The RAID (redundant arrays of inexpensive disks) controller 40 performs RAID control, which involves recording data multiple times, or distributing data by means of striping for recording, to one or more disk drives 31 in the drive unit 30, in response to a recording command, etc., from the host device 50.

Upon receiving a recording or playback instruction from the RAID controller 40, the controller 82 of each disk drive 31 performs controls in such a way as to record or play back data to/from the optical disks with guide layer 111 on both sides of the optical disk 11.

[Host Device 50] The host device 50 is the highest-order device that controls this optical recording system 1. The host device 50 may be a personal computer. The host device 50 generates or prepares data to be recorded and feeds to the RAID controller 40 a recording command for this data to be recorded. The host device 50 also feeds to the RAID controller 40 a read command that contains a file name specified by the user, etc., and in response obtains data of the applicable file name from the RAID controller 40.

[Operation of Disk Drive 31] Next, the OPC process with respect to the two recording layers 113 of the optical disk with guide layer 111 is explained.

First, the basic policy is explained. 1) When recording user data, the recording layers 113 are used one by one in the order from the one farther away from the objective lens 60 of the optical pickup 32. However, the order is not limited to the foregoing, and the recording layers 113 may be used one by one in the order from the one closer to the objective lens 60. 2) In each recording layer 113, user data is recorded in one direction from the inner periphery toward the outer periphery. However, the direction is not limited to the foregoing, and user data may be recorded in one direction from the outer periphery toward the inner periphery. The same is true when recording data to the OPC area. 3) The main OPC area is used in the OPC process for initial recording of user data to each recording layer 113. Any area of the main OPC area remaining after the OPC process will be used, after completion of recording of user data to the data area (after confirmation that no more user data will be recorded to the data area), to record dummy data at the optimal recording power obtained in the OPC process. Note, however, that dummy data will not be recorded to the last recording layer 113 used among the recording layers 113. 4) The OPC process for additional recording to the data area of each recording layer 113 is performed using the sub OPC area.

Figure 6:
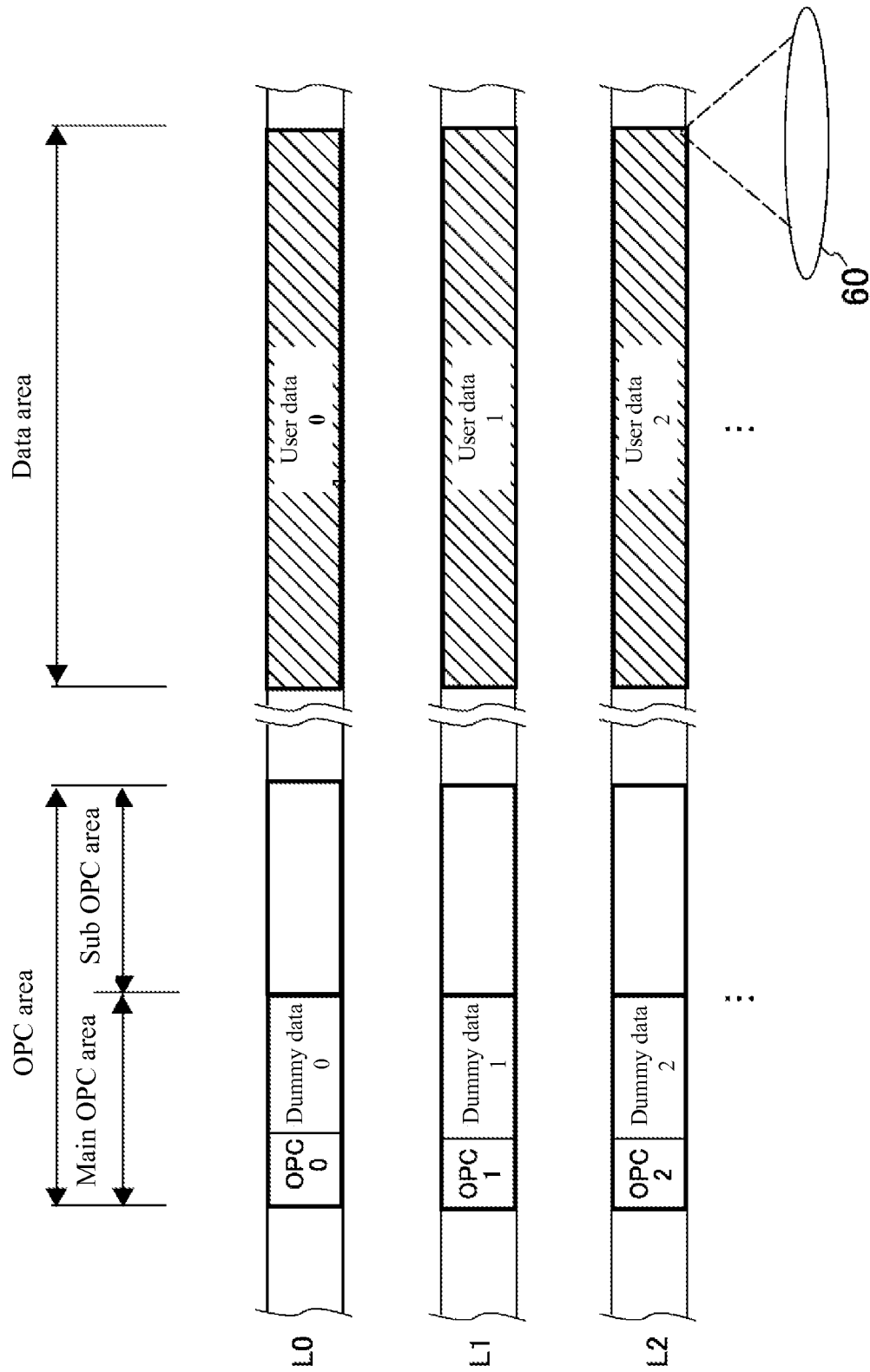
FIG. 6 A drawing showing the first example of operation of the OPC process where user data is recorded all at once to the entire data area of each recording layer.

[Example of Operation 1] FIG. 6 is a drawing explaining an OPC process where user data is recorded all at once to roughly the entire data area of each recording layer 113. In this figure, the OPC areas and data areas do not represent the actual size relationships.

The recording layers 113 are referred to as recording layer L0, recording layer L1, recording layer L2, etc., respectively, from the one farthest away from the objective lens 60 of the optical pickup 32.

The controller 82 of the disk drive 31 performs the OPC process constituting the first calibration process (OPC0) using the main OPC area of recording layer L0, and records user data 0 to roughly the entire data area of recording layer L0 at the optimal recording power obtained by this process. After user data 0 has been recorded, the controller 82 performs the closing process for recording layer L0 as well as controls in such a way as to cause dummy data 0 to be recorded to the remainder of the main OPC area of recording layer L0.

Next, the controller 82 uses the main OPC area of recording layer L1 to perform the OPC process constituting the first calibration process (OPC1). Here, the main OPC area of recording layer L0 is already filled entirely with a pit array comprising the test-written data in the OPC process (OPC0) and dummy data 0, and therefore the OPC process (OPC1) can be performed under conditions equivalent to those applicable to the data area in terms of optical transmission characteristics, and particularly the optimal recording power can be obtained that considers the effect of inter-layer crosstalk that occurs when stray light from adjacent recording layer L0 mixes into the optical detection element.

Thereafter, the controller 82 records user data 1 to roughly the entire data area of recording layer L1 at the optimal recording power obtained in the OPC process (OPC1). After user data 1 has been recorded, the controller 82 performs the closing process for recording layer L1 as well as controls in such a way as to cause dummy data 1 to be recorded to the remainder of the main OPC area of recording layer L1.

Next, the controller 82 uses the main OPC area of recording layer L2 to perform the OPC process constituting the first calibration process (OPC2). Again, the main OPC area of recording layer L1 is already filled entirely with a pit array comprising the test-written data in the OPC process (OPC1) and dummy data 1, and therefore the OPC process (OPC2) can be performed under conditions equivalent to those applicable to the data area in terms of optical transmission characteristics, and particularly the optimal recording power can be obtained that considers the effect of inter-layer crosstalk that occurs when stray light from adjacent recording layer L1 mixes into the optical detection element.

Thereafter, the controller 82 records user data 2 to the data area of recording layer L2 at the optimal recording power obtained in the OPC process (OPC2). After user data 2 has been recorded, the controller 82 performs the closing process for recording layer L2 as well as controls in such a way as to cause dummy data 2 to be recorded to the remainder of the main OPC area of recording layer L2.

The same goes with the next recording layer, or L3 (not illustrated). Note that, since recording layer L3 (not illustrated) is the closest recording layer to the objective lens 60, the operation of recording dummy data to the remainder of the main OPC area is not performed.

[Example of Operation 2] Next, an operation where user data is recorded additionally to the data areas of three recording layers L0, L1 and L2, is explained.

Figure 7:
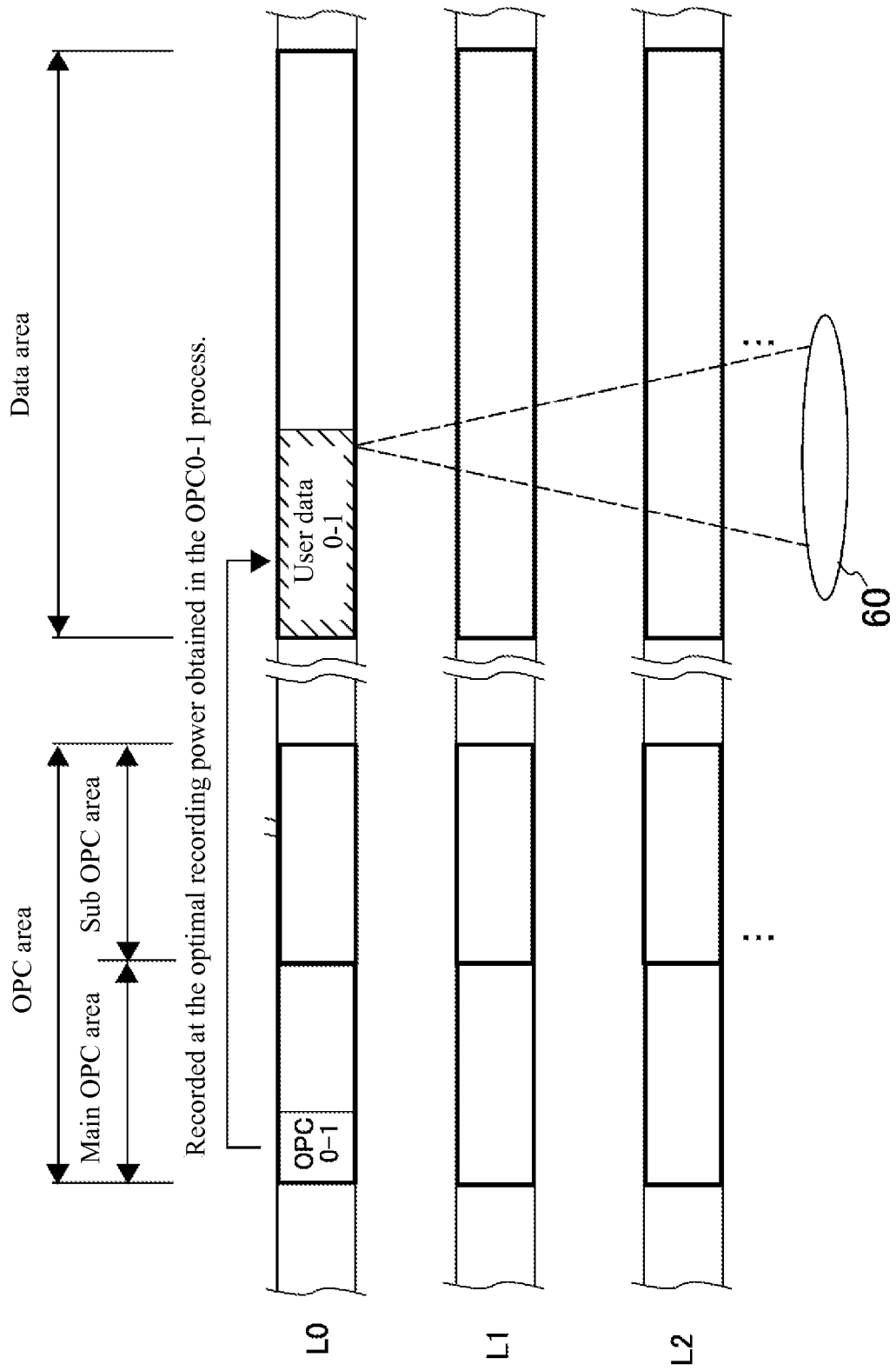
FIG. 7 A drawing explaining the initial recording to recording layer L0 in the second example of operation of the OPC process where user data is recorded additionally to the data area of each recording layer.

(Recording to Recording Layer L0) First, as shown in FIG. 7, the controller 82 of the disk drive 31 uses the main OPC area of recording layer L0 to perform the OPC process constituting the first calibration process (OPC0-1), and records user data 0-1 to a part of the data area of recording layer L0 at the optimal recording power obtained in this OPC process (OPC0-1). After user data 0-1 has been recorded, no closing process is performed for recording layer L0 so as to permit additional recording to the data area.

Figure 8:
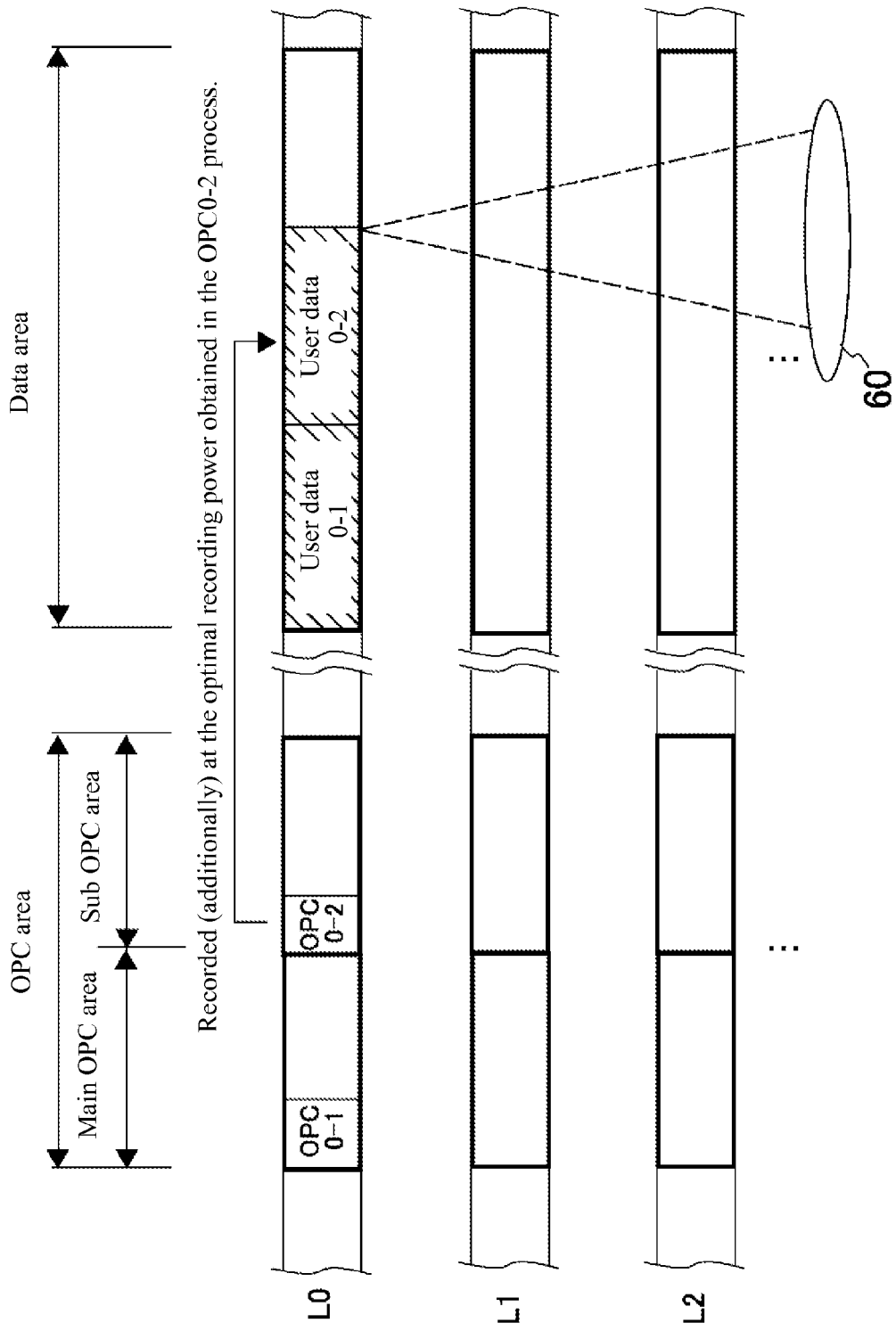
FIG. 8 A drawing explaining the additional recording of user data to recording layer L0 in the second example of operation.

Next, as shown in FIG. 8, assume that user data 0-2 is recorded additionally to the data area of recording layer L0. In this case, the controller 82 of the disk drive 31 uses the sub OPC area to perform the OPC process constituting the second calibration process for obtaining the optimal recording power for additional recording of this user data 0-2 (OPC0-2). The controller 82 performs controls in such a way as to cause user data 0-2 to be recorded to the data area of recording layer L0 at the optimal recording power obtained in this OPC process (OPC0-2).

Figure 9:
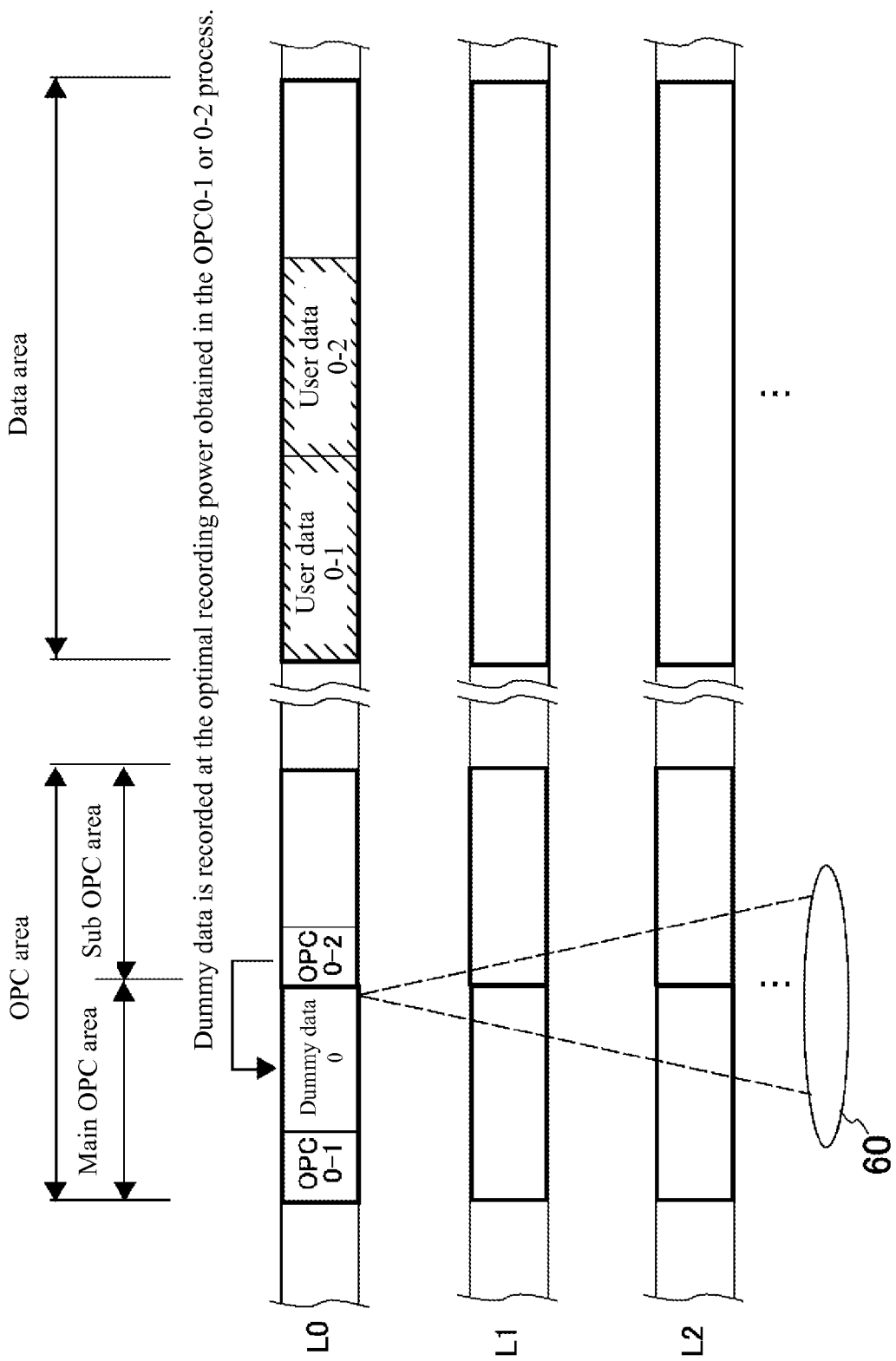
FIG. 9 A drawing explaining the recording of dummy data to recording layer L0 in the second example of operation.

Thereafter, as shown in FIG. 9, the controller 82 performs the closing process for recording layer L0, if it is known that user data of a greater size than the available space in the data area of recording layer L0 will be recorded next, for example, and then performs controls in such a way as to cause dummy data 0 to be recorded to the remainder of the main OPC area of recording layer L0 at the optimal recording power obtained in the OPC process (OPC0-1 or OPC0-2), for example.

Figure 10:
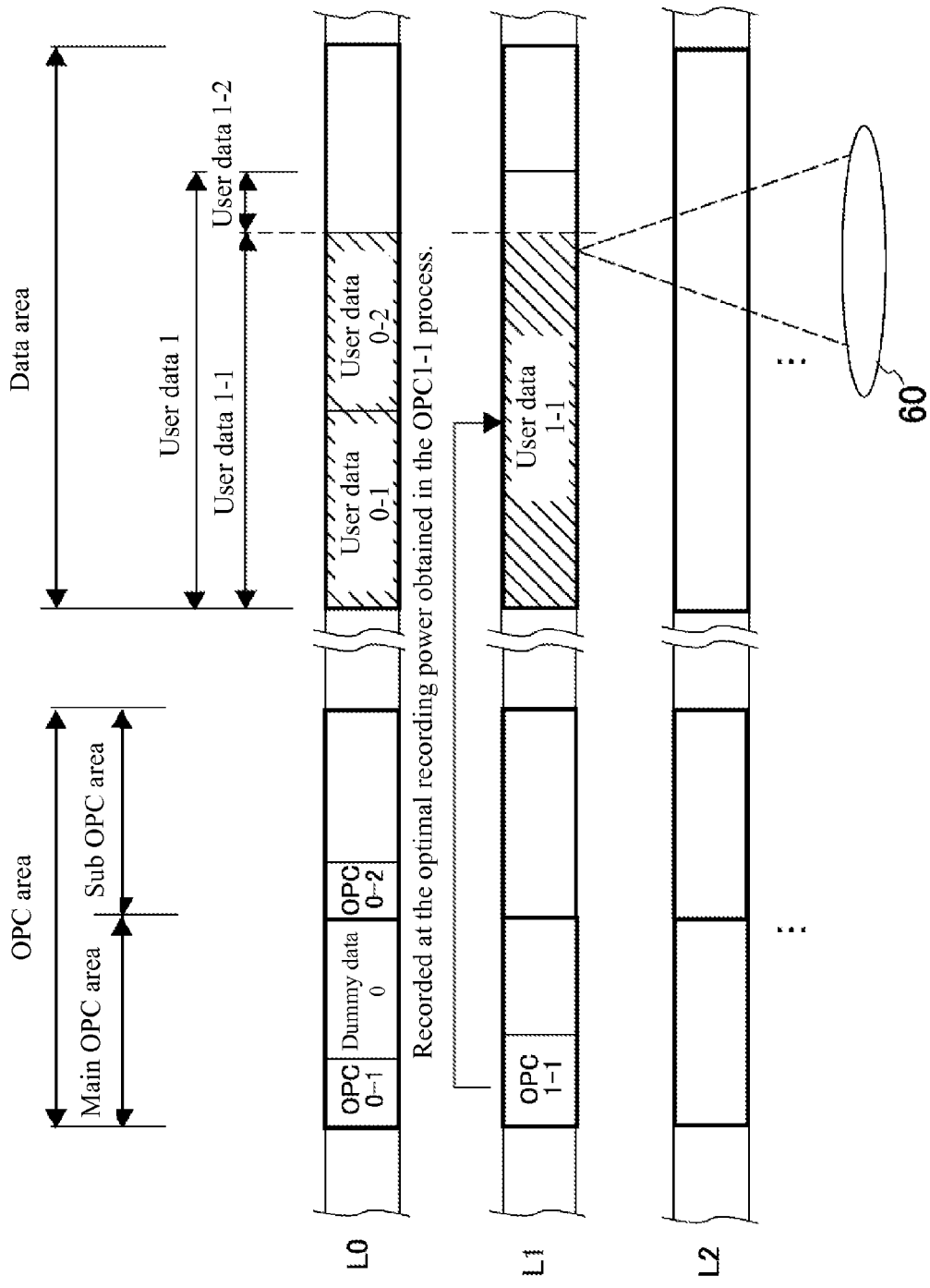
FIG. 10 A drawing explaining the recording of user data to recording layer L1 in the second example of operation.

(Recording to Recording Layer L1) Next, as shown in FIG. 10, assume that user data 1, whose size is greater than the total size of user data 0-1 and user data 0-2 that have been recorded to recording layer L0 adjacent to this recording layer L1, is recorded to the data area of recording layer L1.

Here, "recording layer adjacent" represents the recording layer to which data was recorded immediately before and for which the effect of inter-layer crosstalk must be considered.

In this case, the controller 82 performs controls in such a way as to perform two recordings for user data 1, one for user data 1-1 constituting a first block that corresponds to the total recording size of user data 0-1 and user data 0-2 that have been recorded to recording layer L0 adjacent to recording layer L1, and another for other user data 1-2 constituting a second block.

In other words, the controller 82 uses the main OPC area to perform the OPC process constituting the first calibration process (OPC1-1) in order to obtain the optimal recording power for recording user data 1-1. Here, the main OPC area of recording layer L0 adjacent to recording layer L1 is already filled entirely with a pit array comprising the test-written data in the OPC process and dummy data 1. Accordingly, the OPC process (OPC1-1) can be performed under conditions equivalent to those applicable to the data area to which user data 1-1 is to be recorded, in terms of optical transmission characteristics, and particularly the optimal recording power can be obtained that considers the effect of inter-layer crosstalk that occurs when stray light from adjacent recording layer L0 mixes into the optical detection element. Thereafter, user data 1-1 is recorded to the data area of recording layer L1 at the optimal recording power obtained in the OPC process (OPC1-1).

Figure 11:
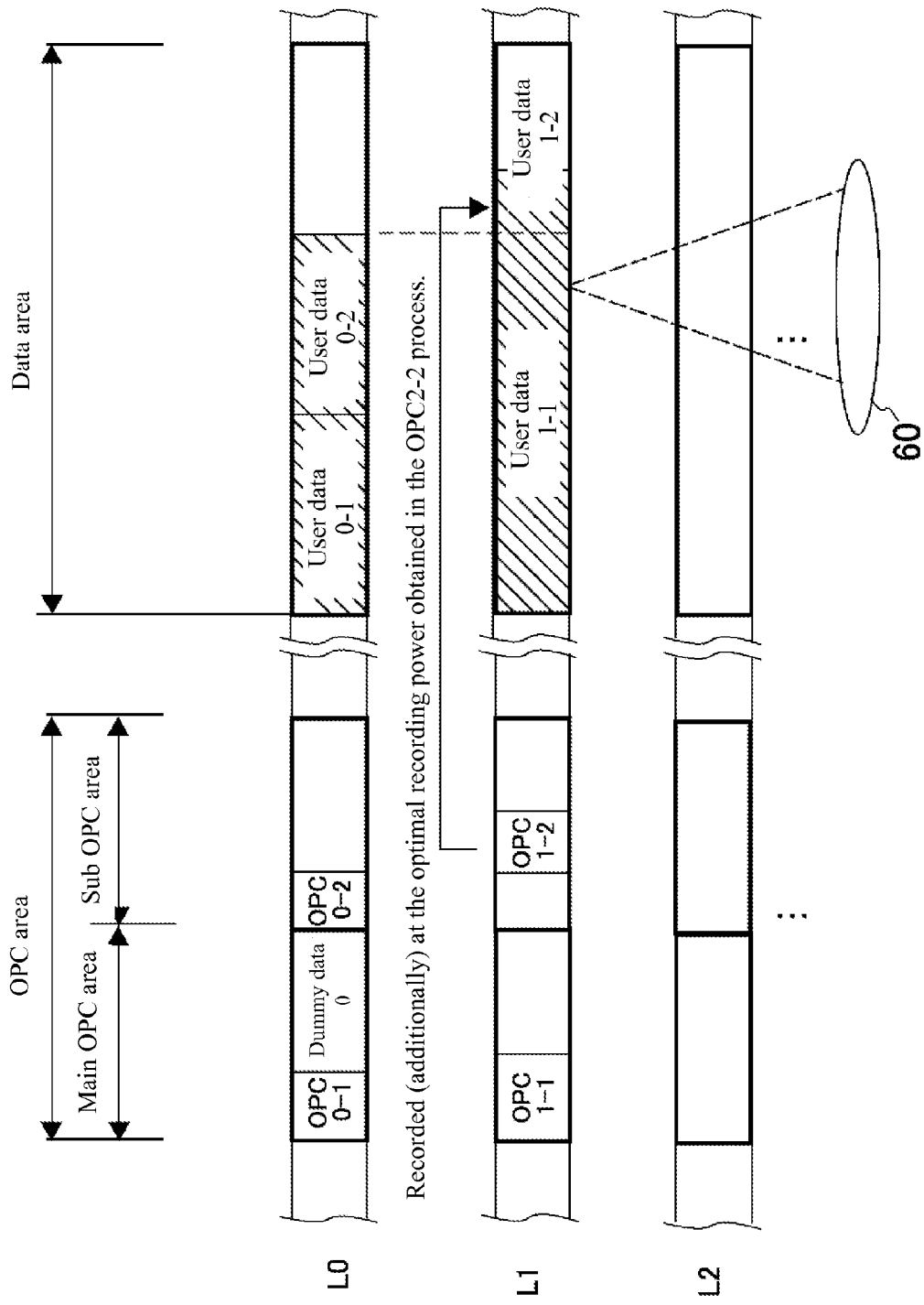
FIG. 11 A drawing explaining the additional recording of user data to recording layer L1 in the second example of operation.

Next, as shown in FIG. 11, the controller 82 calculates the area within the sub OPC area of recording layer L1 that corresponds to the unused area within the sub OPC area of recording layer L0, and uses the calculated area to perform the OPC process constituting the second calibration process (OPC1-2), in order to obtain the optimal recording power for (additionally) recording user data 1-2. This way, the OPC process (OPC1-2) can be performed under conditions equivalent to those applicable to the data area to which user data 1-2 is to be recorded (additionally), in terms of optical transmission characteristics. Thereafter, the controller 82 performs controls in such a way as to cause user data 1-2 to be recorded (additionally) to the data area of recording layer L1 at the optimal recording power obtained in this OPC process (OPC1-2).

Figure 12:
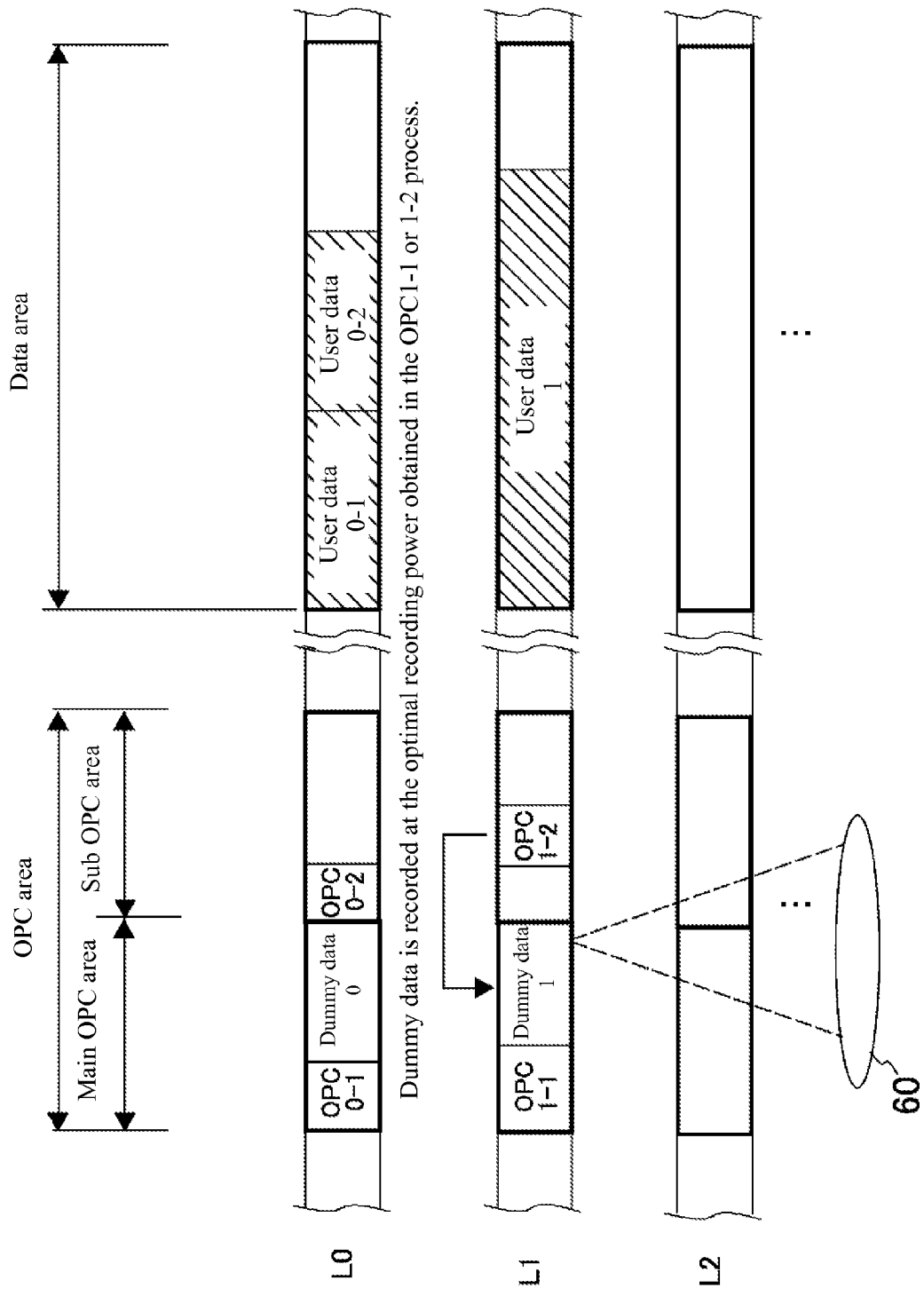
FIG. 12 A drawing explaining the recording of dummy data to recording layer L1 in the second example of operation.

Thereafter, as shown in FIG. 12, the controller 82 performs the closing process for recording layer L1, if it is known that user data of a greater size than the available space in the data area of recording layer L1 will be recorded next, for example, and then performs controls in such a way as to cause dummy data 1 to be recorded to the remainder of the main OPC area of recording layer L1 at the optimal recording power obtained in the OPC process (OPC1-1 or OPC1-2), for example.

Figure 13:
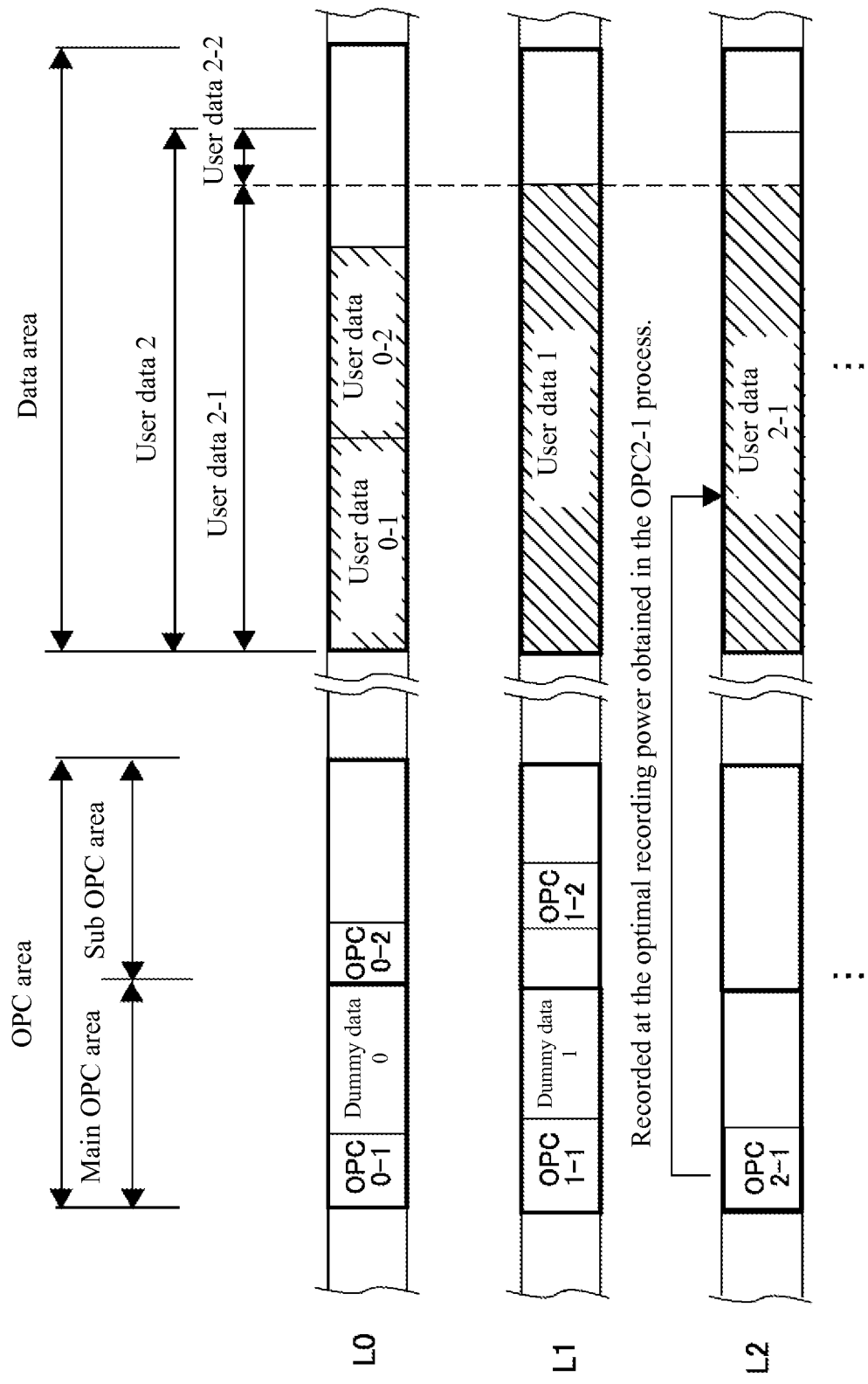
FIG. 13 A drawing explaining the recording of user data to recording layer L2 in the second example of operation.

(Recording to Recording Layer L2) Next, as shown in FIG. 13, assume that user data 2, whose size is greater than that of user data 1 that has been recorded to recording layer L1, is recorded to the data area of recording layer L2. Here, the same thing that happened in the case of recording layer L1 also applies. In other words, the controller 82 performs controls in such a way as to perform two recordings for user data 2, one for user data 2-1 corresponding to the recorded size of user data 1 that has been recorded to recording layer L1 adjacent to recording layer L2, and another for other user data 2-2 constituting a second block.

The controller 82 uses the main OPC area to perform the OPC process constituting the first calibration process (OPC2-1), in order to obtain the optimal recording power for recording user data 2-1. Here, the main OPC area of recording layer L1 adjacent to recording layer L2 is already filled entirely with a pit array comprising the test-written data in the OPC process and dummy data 1. Accordingly, the OPC process (OPC2-1) can be performed under conditions equivalent to those applicable to the data area to which user data 2-1 is to be recorded, in terms of optical transmission characteristics, and particularly the optimal recording power can be obtained that considers the effect of inter-layer crosstalk that occurs when stray light from adjacent recording layer L1 mixes into the optical detection element. Thereafter, user data 2-1 is recorded to the data area of recording layer L2 at the optimal recording power obtained in the OPC process (OPC2-1).

Figure 14:
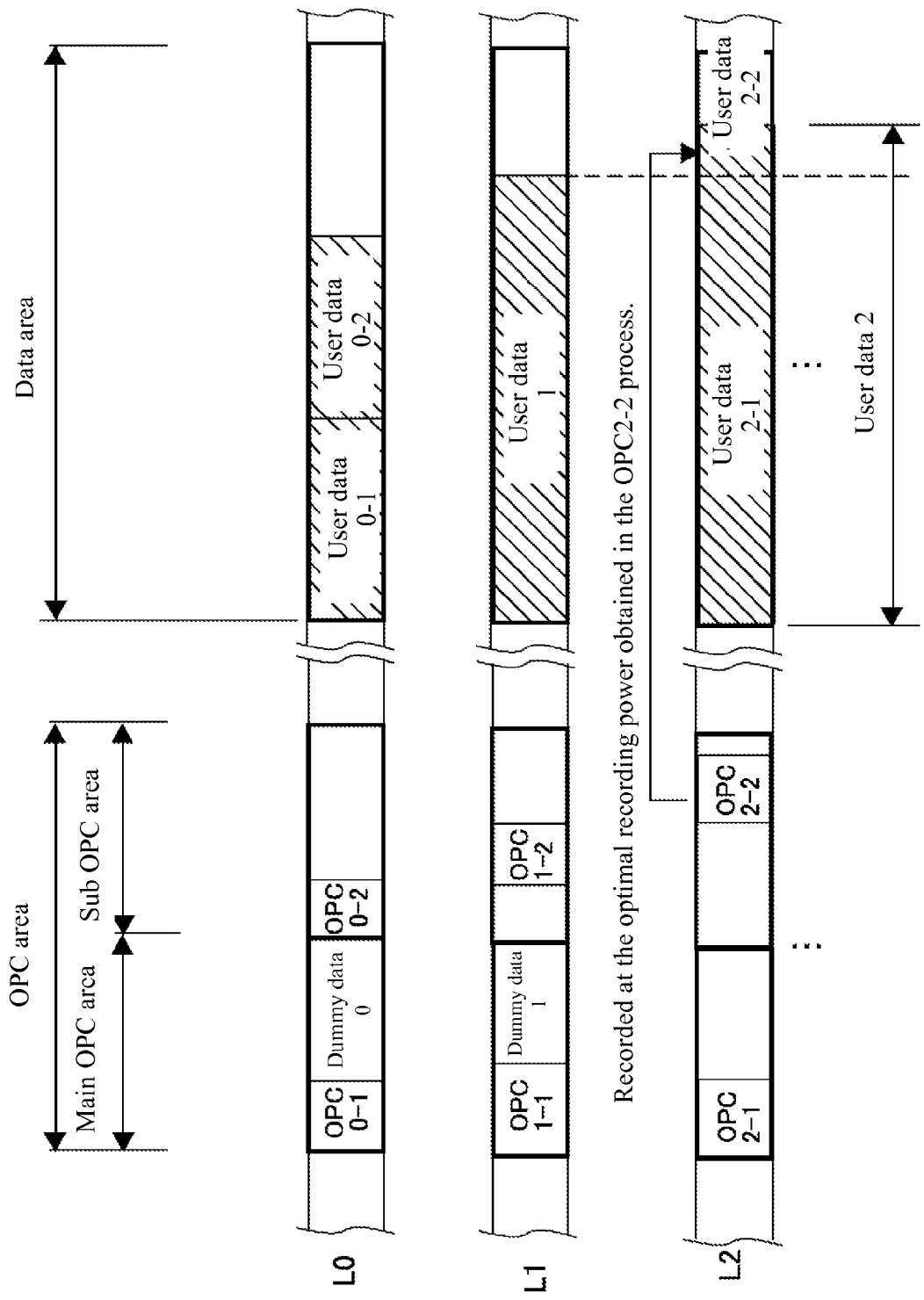
FIG. 14 A drawing explaining the additional recording of user data to recording layer L2 in the second example of operation.

Next, as shown in FIG. 14, the controller 82 calculates the area within the sub OPC area of recording layer L2 that corresponds to the unused area within the sub OPC area of recording layer L1, and uses the calculated area to perform the OPC process constituting the second calibration process (OPC2-2), in order to obtain the optimal recording power for (additionally) recording user data 2-2. This way, the OPC process (OPC2-2) can be performed under conditions equivalent to those applicable to the data area to which user data 2-2 is to be recorded (additionally), in terms of optical transmission characteristics. Thereafter, the controller 82 performs controls in such a way as to cause user data 2-2 to be recorded (additionally) to the data area of recording layer L2 at the optimal recording power obtained in this OPC process (OPC2-2).

Figure 15:
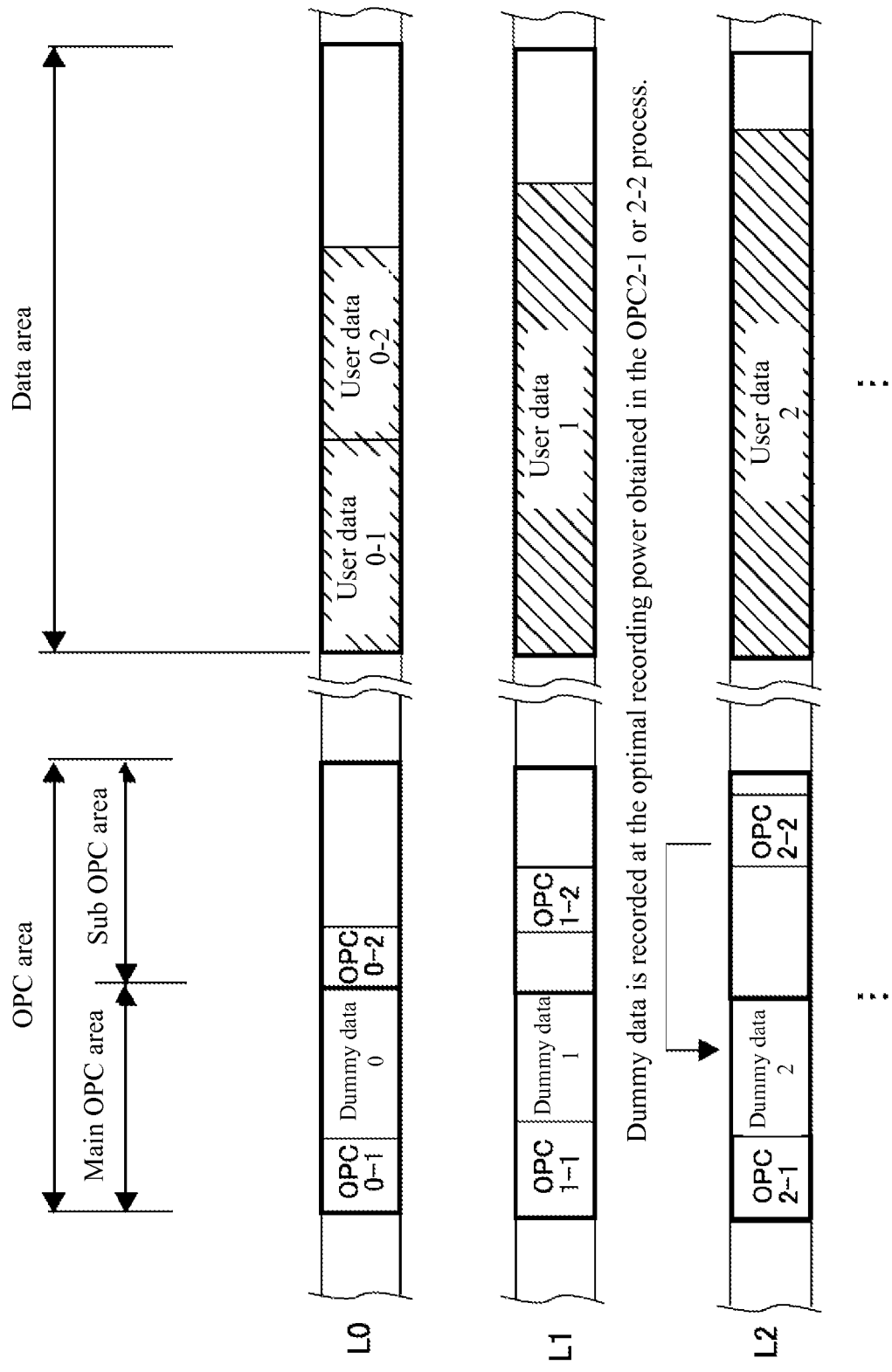
FIG. 15 A drawing explaining the recording of dummy data to recording layer L2 in the second example of operation.
Figure 16:
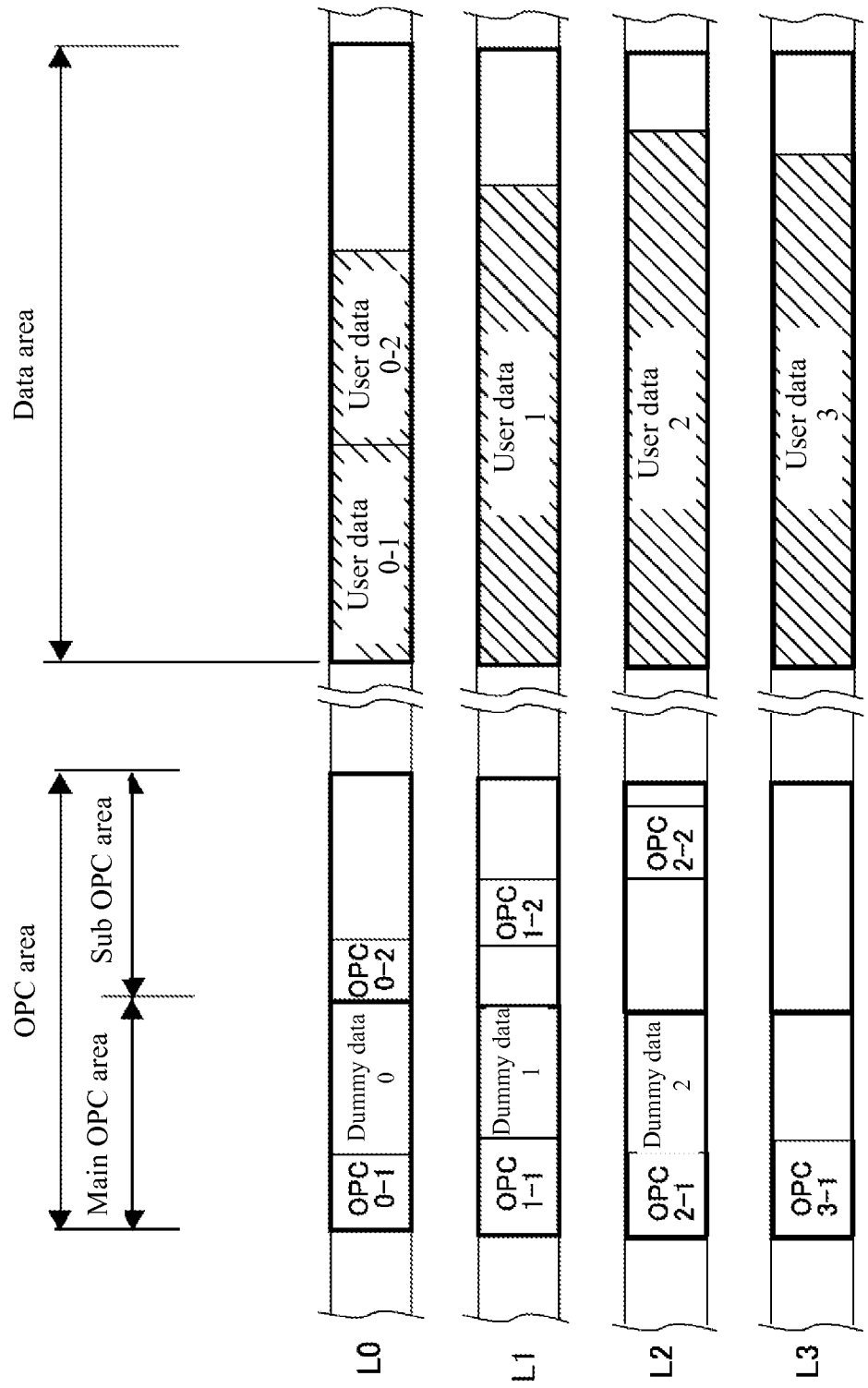
FIG. 16 A drawing explaining the recording of user data to recording layer L3 in the second example of operation.

Thereafter, as shown in FIG. 15, the controller 82 performs the closing process for recording layer L2, if it is known that user data of a greater size than the available space in the data area of recording layer L2 will be recorded next, for example, and then performs controls in such a way as to cause dummy data 2 to be recorded to the remainder of the main OPC area of recording layer L2 at the optimal recording power obtained in the OPC process (OPC2-1 or OPC2-2), for example.

(Recording to Recording Layer L3) Next, assume that user data 3, whose size is smaller than that of user data 2 that has been recorded to the data area of recording layer L2 adjacent to recording layer L3, is recorded to this recording layer L3 closest to the objective lens 60 of the optical pickup 32. In this case, too, the processing is basically the same as with other recording layers. To be specific, the controller 82 uses the main OPC area to perform the OPC process constituting the first calibration process (OPC3-1), in order to obtain the optimal recording power for recording user data 3. Thereafter, the controller 82 performs the closing process for recording layer L3, if it is known that user data of a greater size than the available space in the data area of recording layer L3 will be recorded next, for example. In this case, dummy data is not recorded to the remainder of the main OPC area of recording layer L3.

As explained above, in this embodiment the OPC process for initial recording to the data area is performed for each recording layer using its main OPC area, after which dummy data is recorded to the remainder of the main OPC area, thereby filling the main OPC area with a pit array comprising the test-written data in the OPC process and dummy data. This guarantees that the OPC process for obtaining the optimal recording power for recording to the data area of the recording layer to which data will be recorded next will be performed under conditions equivalent to those applicable to this data area in terms of optical transmission characteristics. In particular, the optimal recording power will be obtained that considers the effect of inter-layer crosstalk that occurs when stray light from an adjacent recording layer mixes into the optical detection element.

Also, according to this embodiment the second calibration process for additional recording to the data area can be performed, for each recording layer, using the sub OPC area provided separately from the main OPC area, which makes it possible to accurately obtain the intensity of laser light for additional recording. In other words, the optimal recording power for additional recording to a multi-layer disk can be calibrated in a favorable manner, by considering the effect of inter-layer crosstalk that occurs when stray light from an adjacent recording layer mixes into the optical detection element.

<Example of Variation> The foregoing explained operations by assuming that data is recorded to the recording layers 113 one by one from the one farthest away from the objective lens 60 of the optical pickup 32, but the same applies when data is recorded to the recording layers 113 one by one from the one closest to the objective lens 60. In this case, too, the recording layer adjacent to the target recording layer, or specifically the recording layer with respect to which the effect of inter-layer crosstalk must be considered, refers to the recording layer to which data was recorded immediately before.

<Other Example of Variation> A disk with guide layer having a guide layer and multiple recording layers, and a device and method for recording to this disk with guide layer, were explained above; however, the present invention is not limited to the foregoing. For example, the present invention provides an effective means for performing the OPC process in a manner considering the effect of inter-layer crosstalk, even with an optical recording device that records to multi-layer disks without guide layer, such as multi-layer disks whose recording layers each have guide tracks of land-groove structure.

DESCRIPTION OF THE SYMBOLS

11—Optical disk, 31—Disk drive, 32—Optical pickup, 33—First light source, 60—Objective lens, 73—First light-source drive part, 81—Characteristic value detection part, 82—Controller, 113, L0, L1, L2—Recording layer

What is claimed is:

1. An optical recording device that records to a multi-layer disk having multiple recording layers, said optical recording device comprising:
   an optical pickup that selectively irradiates laser light to the recording layers via an objective lens; and
   a control part that performs controls in such a way as to:
   set in each of the multiple recording layers a data area where user data is recorded and a calibration area used for an intensity calibration process of the laser light for recording, including a main calibration area and at least one sub calibration area, according to a same layout that applies to all of the multiple recording layers;
   use the main calibration area to perform a first calibration process for implementing initial recording to the data area in each of the multiple recording layers one by one from a recording layer farthest away from or closest to an objective lens of an optical pickup;
   record dummy data to a remainder of the main calibration area; and
   use the at least one sub calibration area to perform a second calibration process for additional recording to the data area,
   wherein the control part performs controls in such a way that, when the recording layer to which data will be recorded next is referred to as a target recording layer and the recording layer to which data was recorded immediately before the target recording layer is referred to as an adjacent recording layer, and when second user data of a larger size than first user data already recorded to the data area of the adjacent recording layer will be recorded to a data area of the target recording layer, then the second user data is divided into a first block corresponding to a size of the first user data and a second block for other data, and the calibration process for the first block is performed as the first calibration process using the main calibration area, while the calibration process for the second block is performed as the second calibration process using the sub calibration area.

2. An optical recording device according to claim 1, wherein the control part performs controls in such a way that, after a closing process to prohibit additional recording of the user data to the data area of the target recording layer, dummy data is recorded to a remainder of the main calibration area.

* * * * *